June 1, 1926.                     1,587,201
P. L. TENNEY
INSTRUMENT DRIVE
Filed June 23, 1924

Inventor
Perry L. Tenney
By his Attorneys
Blackmore, Spencer & Flint

Patented June 1, 1926.

1,587,201

UNITED STATES PATENT OFFICE.

PERRY L. TENNEY, OF MUNCIE, INDIANA, ASSIGNOR TO GENERAL MOTORS CORPORATION, OF DETROIT, MICHIGAN, A CORPORATION OF DELAWARE.

INSTRUMENT DRIVE.

Application filed June 23, 1924. Serial No. 721,785.

This invention relates to mechanism for driving speedometers and similar instruments from an automobile transmission, and is illustrated as embodied in the transmission now used in Oakland and Olds automobiles. One feature of the invention relates to supporting the usual instrument-driving shaft in bearings, one of which is a closed plug threaded into place from outside the transmission housing and the other of which is a bushing threaded in place from inside the housing. Another feature of the invention relates to forming the bearing members, and the sleeves into which they are threaded, of the same diameter, so that the parts may be turned around to take the drive out at either the right or left of the transmission.

The above and other features of the invention, including various novel and desirable particular constructions, will be apparent from the following description of the illustrative embodiments shown in the accompanying drawings, in which.

Figure 1:
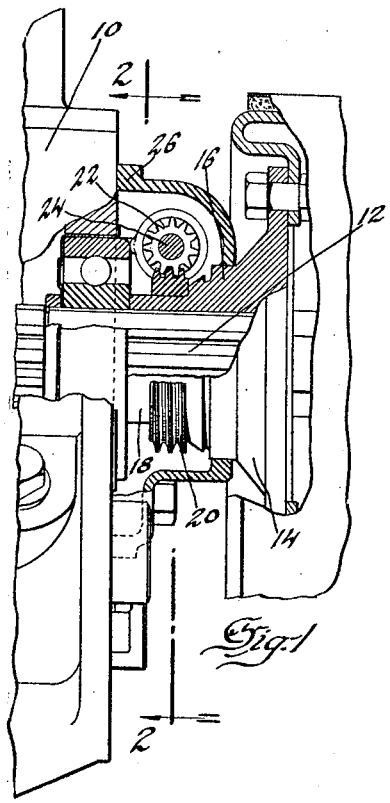
Figure 1 is a side elevation, partly broken away in a central vertical plane, of the rear end of the transmission used on the Oakland and Olds automobiles.
Figure 2:
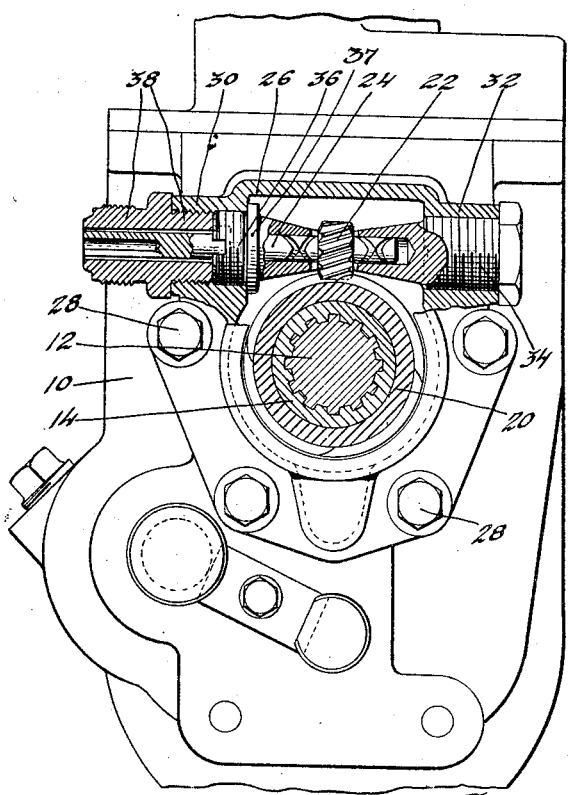
Figure 2 is a section on the line 2—2 of Figure 1, showing the bearings for the instrument-driving shaft.

In the arrangement shown in Figures 1 and 2, a transmission having a housing 10 is arranged to drive at different speeds a drive shaft 12 projecting through the rear end of the housing and splined to a part 14 of the usual universal joint connected to the propeller shaft. The part 14 is formed with cylindrical portions 16 and 18, and on the portion 18 is arranged a gear such as a worm 20 meshing with a pinion or worm wheel 22 fast on a cross shaft 24 arranged to drive the usual flexible connections of a speedometer or other instrument.

Surrounding the projecting end of shaft 12 is a detachable part or supplemental housing 26 having an opening in its rear face with its edge immediately adjacent the part 16, the supplemental housing being secured to the remainder of the transmission housing 10 by tap screws 28, or in any other desired manner. This supplemental housing is formed with integral sleeves 30 and 32 having axially alined openings surrounding the instrument-driving shaft 24, the sleeves being on opposite sides of the drive shaft 12.

In one of the sleeves, as for example sleeve 32, is threaded from the outside of the housing a plug 34 constructed and arranged to serve as a bearing for the free end of shaft 24. The other bearing for this shaft is in the form of a bushing 36 threaded from the inside of the housing into sleeve 30 and having a flange 37 engaging the inner wall of the housing. Preferably the plug 34 and bushing 36 are formed with integral extensions as shown, positioning pinion 22 axially by engagement with its flat sides. A ferrule 38 is shown threaded from outside the housing into sleeve 30, the ferrule surrounding shaft 24 without engaging it and being externally threaded to receive the usual coupling of the flexible connections.

Sleeves 30 and 32 are of the same diameter, so that the parts may be assembled in the reverse order from that shown, with plug 34 in sleeve 30, and with bushing 36 and ferrule 38 in sleeve 32, thus taking the drive out at the right (Figure 2) instead of the left.

Figure 3:
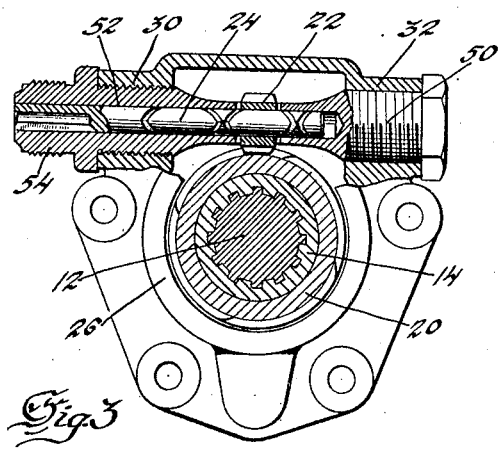
Figures 3 and 4 are views corresponding to part of Figure 2, but showing different particular sets of bearing members for the instrument-driving shaft.
Figure 4:
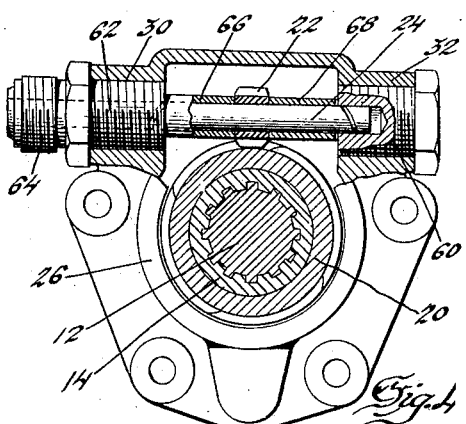

In Figures 3 and 4 are shown two other arrangements which can be used interchangeably with those described, without any change in the supplemental housing 26. In Figure 3 there are two bearings both of which are threaded into sleeves 30 and 32 from outside the housing, one being a plug 50 and the other a bushing 52 externally threaded at 54 to receive the coupling. Plug 50 and bushing 52 have integral extensions axially positioning pinion 22. In Figure 4 there is a corresponding plug 60 and bushing 62 threaded at 64 to receive the coupling, but instead of the integral extensions spacing sleeves 66 and 68 are provided.

While particular constructions have been described in detail, it is not my intention to limit the scope of the invention to those constructions, or otherwise than by the terms of the appended claims.

I claim:

1. A gear housing for attachment to a vehicle transmission casing, the housing having an opening for the passage of the propeller shaft therethrough and having two aligned openings, the axial line of the openings being transverse to the axis of the propeller shaft, a plug in one opening, a tubular bushing in the other opening, the bushing having a flange engaging a flat surface on the inner wall of the housing, a driven shaft extending through the tubular bushing, its end journaled in the plug, cooperating gearing elements on the shafts, the plug and bushing having internal projections positioning the gear element on the driven shaft.

2. A drive assembly as defined by claim 1, in which the aligned openings are of the same diameter and are surrounded by flat surfaces on the inner wall for the purpose of permitting a reversal of the parts.

3. A housing containing two gear connected shafts, extending at right angles to each other, the gear on the driven shaft being located midway between two threaded openings of like diameter, one opening having a threaded plug with a head engaging the housing on the outside, the other opening having a threaded bushing with a flange engaging an internal face of the housing adjacent the opening, the bushing and plug provided with inwardly extending projections positioning the gear, the driven shaft extending through the bushing and ending in an opening therefor in the plug, the plug and bushing being interchangeable.

In testimony whereof I affix my signature.

PERRY L. TENNEY.